United States Patent
Yamazaki et al.

(10) Patent No.: US 6,966,223 B2
(45) Date of Patent: Nov. 22, 2005

(54) VEHICLE SPEED DISPLAY APPARATUS

(75) Inventors: Masaki Yamazaki, Saitama (JP);
Takeshi Nakazawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/753,109

(22) Filed: Jan. 7, 2004

(65) Prior Publication Data
US 2004/0187572 A1  Sep. 30, 2004

(30) Foreign Application Priority Data
Jan. 8, 2003 (JP) ............................. 2003-002136

(51) Int. Cl.$^7$ ............................. G01P 3/00; G01P 21/00
(52) U.S. Cl. ......................... 73/489; 73/1.37; 702/148
(58) Field of Search ....................... 73/489, 491, 494, 73/498, 499, 129, 509, 1.37; 702/145, 148; 701/69, 70, 74

(56) References Cited
U.S. PATENT DOCUMENTS

| | | | | |
|---|---|---|---|---|
| 4,417,641 A | * | 11/1983 | Kageyama | 180/247 |
| 4,613,008 A | * | 9/1986 | Hiraiwa et al. | 180/247 |
| 5,566,094 A | * | 10/1996 | Kojima et al. | 702/87 |
| 5,612,880 A | * | 3/1997 | Kojima et al. | 701/75 |
| 6,466,855 B2 | * | 10/2002 | Yamaguchi | 701/70 |
| 6,526,367 B1 | * | 2/2003 | Yamamoto et al. | 702/148 |
| 2002/0104703 A1 | * | 8/2002 | Goto et al. | 180/233 |

\* cited by examiner

*Primary Examiner*—Helen Kwok
(74) *Attorney, Agent, or Firm*—Carrier, Blackman & Associates, P.C.; William D. Blackman; Joseph P. Carrier

(57) ABSTRACT

A vehicle speed display apparatus capable of displaying an accurate vehicle speed in either 2WD mode or in 4WD mode. A vehicle speed calculating unit 51 calculates the vehicle speed, according to the output from a wheel rotational speed sensor 22. A 2WD/4WD detecting unit 52 switches the destination of the vehicle speed calculated by the vehicle speed-calculating unit 51 between a 2WD correcting unit 53 and a 4WD correcting unit 54, depending whether the vehicle is traveling in 2WD mode or in 4WD mode. The 2WD correcting unit 53 corrects the vehicle speed in the 2WD mode using a first correction coefficient for the 2WD mode, and the 4WD correcting unit 54 corrects the vehicle speed in the 4WD mode using a second correction coefficient for the 4WD mode. The corrected vehicle speed is displayed by a vehicle speed display unit 55.

10 Claims, 4 Drawing Sheets

VEHICLE SPEED DISPLAY APPARATUS

CROSS-REFERENCE TO RELATED APPLICATIONS

The present application claims priority under 35 USC 119 based on Japanese patent application No. 2003-002136, filed Jan. 8, 2003.

BACKGROUND OF THE INVENTION

1. Field of the Invention

The present invention relates to vehicle speed display apparatus. More particularly, the invention relates to a vehicle speed display apparatus for a vehicle which can be switched between 2WD and 4WD, in which an accurate readout of vehicle speed may be obtained in either 2WD mode or in 4WD mode.

2. Description of the Background Art

Japanese patent publication no. JP-UM-B-1-22093 discloses a vehicle speed display unit in which the number of pulses proportional to the rotational speed of the wheel is counted per unit of travel distance, and the counted value is input into a calculating circuit for calculating and displaying the vehicle speed. The number of pulses per unit travel distance is proportional to the rotational speed of the wheel.

The traveling speed of the vehicle is, as is disclosed in the publication described above, normally obtained by detecting the number of pulses proportional to the rotational speed of the wheel, and calculating and outputting the detected number of pulses.

There is a known 4-wheeled buggy (ATV: All Terrain Vehicle), the driving mode of which can be switched between 2WD and 4WD for usages as a traveling vehicle for agriculture or cattle breeding and as a recreational vehicle. In such a four-wheeled buggy, a difference between the rotational speed of the front wheel and the rotational speed of the rear wheel may be calculated in advance, to improve operability during travel. In the 4WD mode, for example, the rotational speed of the front wheel may be set in advance to a lower value than the rotational speed of the rear wheel.

Considering the use of the number of pulses that is proportional to the rotational speed of the wheel for displaying the vehicle speed of the four-wheeled buggy, as is disclosed in the aforementioned publication, since the rotational speed between the driving wheel (rear wheel) and the driven wheel (front wheel) are substantially the same when traveling in the 2WD mode, it is possible to display a value which matches the actual vehicle speed by obtaining the vehicle speed from the relation between the detected number of pulses and the actual vehicle speed and displaying the obtained value.

However, when a difference between the rotational speed of the front wheel and the rotational speed of the rear wheel in the 4WD mode is calculated in advance, as described above, the relation between the detected number of pulses and the actual vehicle speed is different from 2WD mode. In 4WD mode, the speed obtained and displayed in the same manner as in the 2WD mode has a margin of error with respect to the actual vehicle speed, and thus the displayed value is not the actual exact vehicle speed.

In view of such circumstances, it is an object of the present invention to provide a vehicle speed display apparatus for a vehicle which can be switched between 2WD and 4WD, in which an accurate display of the actual vehicle speed may be obtained in either 2WD mode or 4WD mode.

Although the known devices have some utility for their intended purposes, there is still a need to provide an improved vehicle speed display apparatus for an all-terrain vehicle, which is capable of accurately displaying vehicle speed in either 2WD or in 4WD. In particular, there is a need for an improved vehicle speed display apparatus including components designed to solve the above-mentioned problems.

SUMMARY OF THE INVENTION

In order to achieve the object described above, the present invention provides a speed display apparatus for a vehicle which can be switched between 2WD and 4WD by a drive mode switching unit.

A vehicle speed display apparatus according to a first illustrative embodiment of the invention includes a wheel rotational speed sensor for detecting the rotational speed of any one of the wheels of a vehicle. The apparatus also includes a vehicle speed calculator for calculating the vehicle speed using output from the wheel rotational speed sensor, and a display mechanism for displaying the calculated vehicle speed. The system includes a drive mode sensor for detecting whether the vehicle is traveling in the 2WD mode or in the 4WD mode.

The vehicle speed calculator includes a first vehicle speed calculating unit for calculating the vehicle speed based on the output from the wheel rotational speed sensor and a first predetermined condition, and a second vehicle speed calculating unit for calculating the vehicle speed based on the output from the wheel rotational speed sensor and a second predetermined condition. The display mechanism displays the vehicle speed calculated by the first vehicle speed calculating unit or the second vehicle speed calculating unit, based on the result detected by the drive mode sensor.

In a second aspect of the present invention, the first vehicle speed calculating unit calculates the vehicle speed using output from the wheel rotational speed sensor and a first correction coefficient, and the second vehicle speed calculating unit calculates the vehicle speed using the output from the wheel rotational speed sensor and a second correction coefficient, and the first correction coefficient is larger than the second correction coefficient.

In a third aspect of the present invention, the drive mode sensor detects whether the driving mode of the vehicle is 2WD or 4WD depending on the state of the drive mode switch.

According to the first aspect of the invention, the vehicle speed calculator includes the first vehicle speed calculating unit and the second vehicle speed calculating unit, and when traveling in the 2WD mode, the vehicle speed may be calculated based on the relation between the number of pulses and the vehicle speed corresponding to the 2WD mode. When traveling in the 4WD mode, the vehicle speed may be calculated based on the relation between the number of pulses and the vehicle speed corresponding to the 4WD mode. Therefore, the same display accuracy of the speed with respect to the actual vehicle speed may be obtained in either the 2WD mode or the 4WD mode.

According to the second aspect of the invention, since the vehicle speed may be calculated using a correction coefficient corresponding to the 2WD mode and the 4WD mode, the display speed with small error with respect to the actual vehicle speed may be obtained in the 2WD mode and in the 4WD mode.

According to the third aspect of the invention, when the driving mode is switched between 2WD and 4WD, calculation for 2WD and calculation for 4WD may be switched automatically for calculating the vehicle speed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Herein, only structures considered necessary for clarifying the present invention are described. Other conventional structures, and those of ancillary and auxiliary components of the system, are assumed to be known and understood by those in the art. Throughout the present description and in the claims, the term "2WD" will be used will be used as a shorthand term to mean two-wheel drive, and the term "4WD" will be used as a shorthand term to mean four-wheel drive, as is common in the art. The present invention will now be described referring to the attached drawings.

Figure 1:
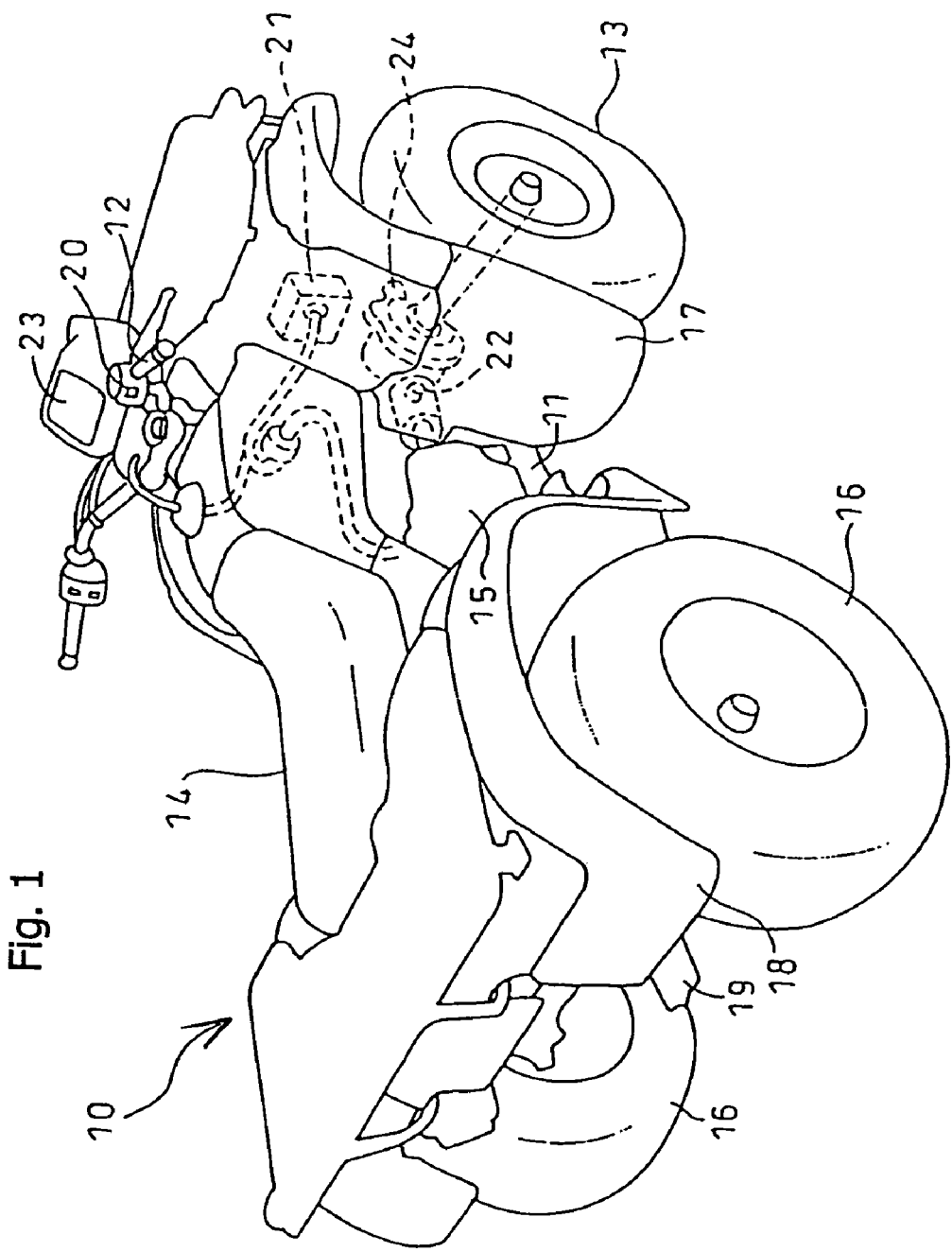
FIG. 1 is a perspective view of a four-wheeled buggy incorporating a vehicle speed display apparatus according to an illustrative embodiment of the present invention.

FIG. 1 is a perspective view of a four-wheeled buggy 10, or all-terrain vehicle, incorporating a vehicle speed display apparatus according to an illustrative embodiment of the present invention. In the drawing, the portions of the drive unit which relate specifically to the present invention are schematically shown by broken lines.

A handlebar 12 is rotatably mounted to a vehicle body 11 of a four-wheeled buggy 10, and a front wheel 13 is steerably connected to the handlebar 12 via a steering gear unit (not shown). A seat 14 is disposed on top of the vehicle body 11, and a powertrain 15 including an engine, a clutch and a transmission is disposed below the seat 14. Rear wheels 16, 16 are driving wheels when traveling in the 2WD mode, and are driven by the powertrain 15. A front fender 17 and a rear fender 18 are provided around the front wheel 13 and the rear wheel 16, respectively. A muffler 19 projects from the lower rear portion of the vehicle body 11.

The handlebar 12 is provided with a 2WD/4WD changeover switch or drive mode switch 20, and the output therefrom is supplied to a powertrain control unit 21, provided in a protected location at the front of the vehicle body 11.

The powertrain control unit 21 includes an engine control unit and a 2WD/4WD changeover control unit, and controls a power transmission system including a clutch so that the driving mode can be switched between 2WD and 4WD according to the output from the drive mode switch 20. The powertrain control unit 21 also activates and controls the engine, based on the outputs from various switches, levers, and pedals provided on the handlebar 12.

A rear wheel speed sensor 22 detects the rotational speed of the rear wheel 16, which corresponds to the driving wheel in the 2WD mode. The speed sensor 22 may be the conventional speed sensor that outputs pulses of cycles according to the rotational speed of the rear wheel 16, the axle thereof, and the propeller shaft. In the figure, a speed sensor that outputs pulses, the cycle of which decreases in proportion to the rotational speed of the propeller shaft, is shown.

A display unit 23, such as a liquid crystal display apparatus, is provided at the center of the handlebar 12. The display unit 23 functions as a vehicle speed display unit for displaying a vehicle speed, for example, in a digital model.

A front wheel speed sensor 24, for detecting the rotational speed of the front wheel 13, is also provided. The front wheel speed sensor 24 is operable to disable switching between 2WD and 4WD by the drive mode switch 20, when the difference of the rotational speed between the front wheel 13 and the rear wheel 16 is more than a prescribed value.

Figure 2:
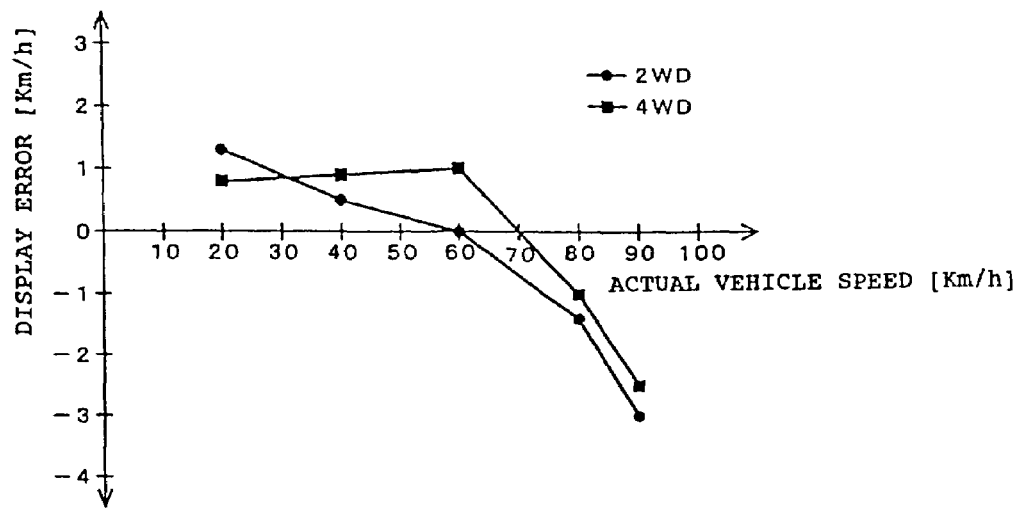
FIG. 2 is a graph showing results of measurement of the error of the displayed speed with respect to the actual vehicle speed in the 2WD mode and in the 4WD mode.

FIG. 2 shows results of measurement of the margin of error with respect to the actual vehicle speed in the 2WD mode and in the 4WD mode when the vehicle speed is displayed based on the output of the speed sensor 22. As is seen from the measurements, the error of displayed vehicle speed with respect to the actual vehicle speed in the 2WD mode and that in the 4WD mode differ from each other.

Figure 3:
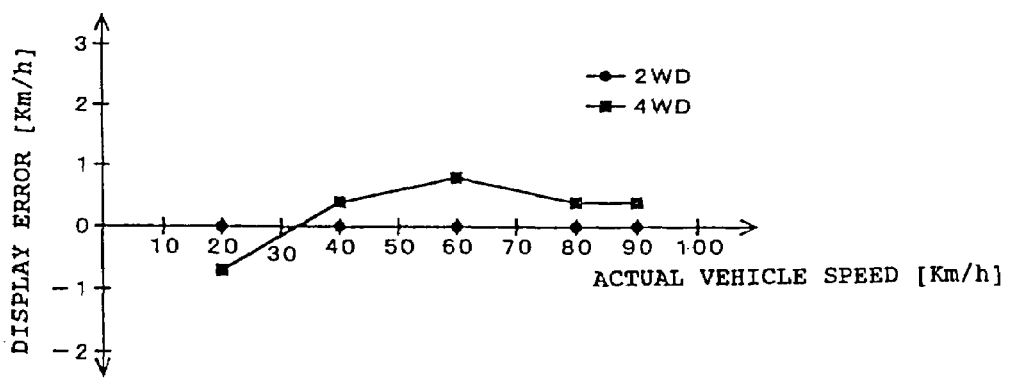
FIG. 3 is a graph showing the case where the characteristics shown in FIG. 2 is corrected based on the vehicle speed in the 2WD mode.

When correction is made without considering the difference of the error, it is impossible to obtain the satisfactory results both in the 2WD mode and in the 4WD mode. For example, when correction is made based on the vehicle speed in the 2WD mode, as shown in FIG. 3, the displayed vehicle speed in the 2WD mode matches the actual vehicle speed, but the displayed vehicle speed in the 4WD mode does not match the actual vehicle speed.

In contrast, when correction is made based on the vehicle speed in the 4WD mode, the displayed vehicle speed in the 4WD mode matches the actual vehicle speed, but the displayed vehicle speed in the 2WD mode does not match the actual vehicle speed.

Figure 4:
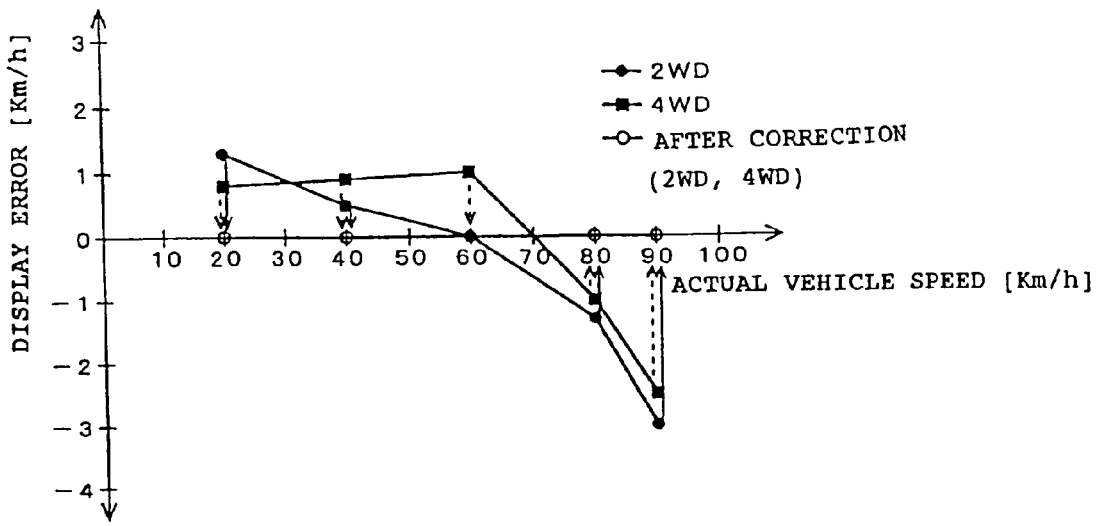
FIG. 4 is a graph showing the case in which the characteristics shown in FIG. 2 are corrected according to the present invention.

The present invention can provide a displayed vehicle speed which matches the actual vehicle speed in either the 2WD mode or the 4WD mode, and perform correction corresponding to the 2WD mode and the 4WD mode respectively, as shown in FIG. 4.

Figure 5:
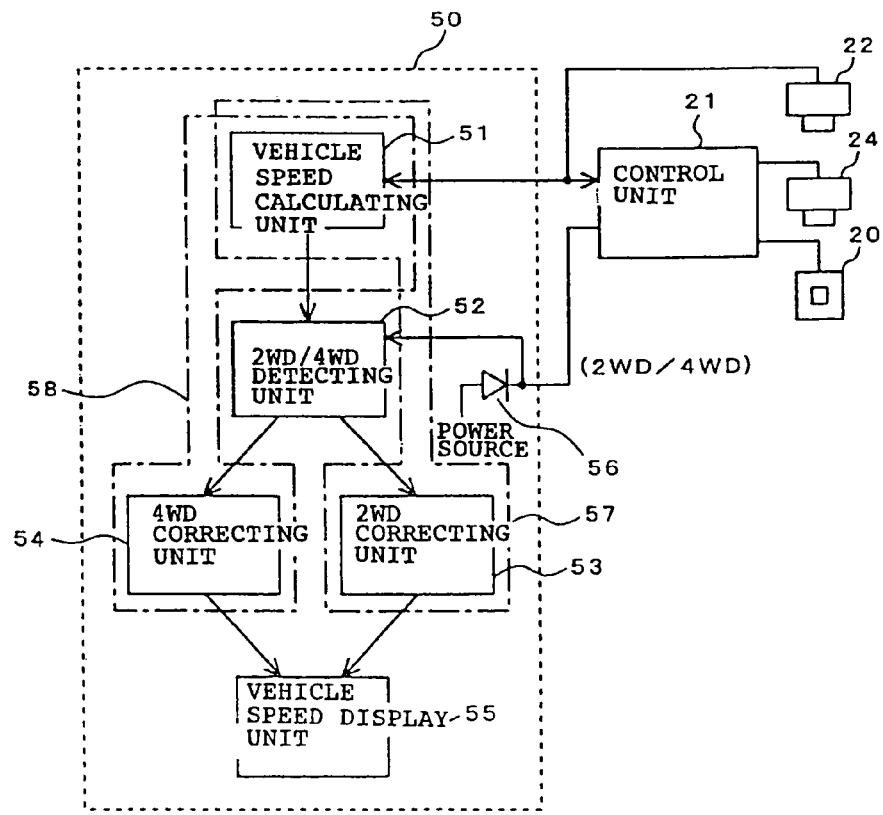
FIG. 5 is a schematic block diagram showing an illustrative embodiment of a vehicle speed display apparatus according to the present invention.

FIG. 5 is a schematic block diagram showing one embodiment of a vehicle speed display apparatus according to the present invention. The outputs (pulses) from the rear wheel speed sensor 22, for detecting the rotational speed of the rear wheel 16, and the front wheel speed sensor 24, for detecting the rotational speed of the front wheel 13, are supplied to the control unit 21. The output from the drive mode switch 20 is also supplied to the control unit 21. The output from the rear wheel speed sensor 22 is supplied to a combination speed meter 50.

The combination speed meter 50 includes a vehicle speed calculating unit 51, a 2WD/4WD detecting unit 52, a 2WD correcting unit 53, a 4WD correcting unit 54, a vehicle speed display unit 55, and a 2WD/4WD indicator 56 including a LED.

When compared with the construction stated in the appended claims, the combination of the vehicle speed calculating unit 51, the 2WD correcting unit 53, and the 4WD correcting unit 54 corresponds to the vehicle speed calculator, the vehicle speed calculating unit 51 and the 2WD correcting unit 53 correspond to the first vehicle speed calculating unit 57, the vehicle speed calculating unit 51 and the 4WD correcting unit 54 correspond to the second vehicle speed calculating unit 58, the 2WD/4WD detecting unit 52 corresponds to the drive mode sensor, and the vehicle speed display unit 55 corresponds to the display mechanism. The vehicle speed display unit 55 also corresponds to the display apparatus 20 in FIG. 1.

The vehicle speed-calculating unit 51 calculates the vehicle speed, based on the output of the rear wheel speed sensor 22, by calculating the vehicle speed based on the number of pulses to be supplied from the speed sensor 22 per unit period. The calculated vehicle speed differs from the actual speed as shown in FIG. 2.

The 2WD/4WD detecting unit 52 detects whether the vehicle is traveling in the 2WD mode or in the 4WD mode, and depending on the detected results, switches the destination of the vehicle speed calculated by the vehicle speed calculating unit 51 between the 2WD correcting unit 53 and the 4WD correcting unit 54.

The 2WD correcting unit 53 corrects the vehicle speed supplied from the vehicle speed calculating unit 51 through the 2WD/4WD detecting unit 52 when traveling in the 2WD mode using a predetermined condition for the 2WD mode, for example, using the 2WD correction coefficient. The 4WD correcting unit 54 corrects the vehicle speed supplied from the vehicle speed calculating unit 51 through the 2WD/4WD detecting unit 52 when traveling in the 4WD mode using a predetermined condition for the 4WD mode, for example, the 4WD correction coefficient.

These corrections are, as shown in FIG. 4, to adapt the vehicle speeds calculated by the vehicle speed-calculating unit 51 when traveling in the 2WD mode or in the 4WD mode to values that match the actual vehicle speeds, respectively. The corrected vehicle speed is supplied to and displayed by the vehicle speed display unit 55.

Figure 6:
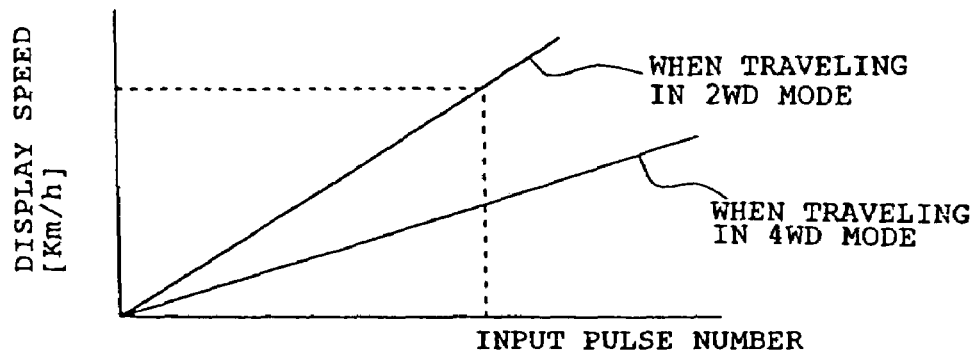
FIG. 6 is an explanatory graph showing an example of the corrected results using the correction coefficients for the 2WD mode and the 4WD mode.

FIG. 6 is an explanatory graph showing an example of the corrected results using the correction coefficients for the 2WD mode and the 4WD mode. In this example, assuming the case in which the vehicle speed calculated by the vehicle speed calculating unit 51 is larger in the 4WD mode than in the 2WD mode, even with the same number of pulses, the 2WD correction coefficient (correction coefficient in the 2WD correcting unit 53) is set to a larger value than the 4WD correction coefficient (correction coefficient in the 4WD correcting unit 54). Accordingly, the displayed speed in the 2WD mode is set to a value larger than the displayed speed in the 4WD mode, even with the same number of pulses, so that the respective displayed speeds match the actual speed.

Correction by the 2WD correcting unit 53 and correction by the 4WD correcting unit 54 may be performed by the use of a function with the vehicle speed calculated by the vehicle speed calculating unit 51 as a variable. Alternatively, the correction may be performed by using a conversion table, in which the vehicle speed, calculated by the vehicle speed calculating unit 51,is entered as an address. When using the table, complicated correction can easily be made simply by entering the contents in the table, and by reentering the contents as needed, it is also possible to adjust so that more realistic correction is realized.

Input into the 2WD/4WD detecting unit 52 may be 2WD/4WD signals for controlling display of the 2WD/4WD indicator 56, which are supplied from the control unit 21 based on the output form the drive mode switch 20.

The 2WD/4WD signals are signals for controlling display of the 2WD/4WD indicator 56 provided between the power source and a 2WD/4WD signal terminal of the control unit 21. For example, the signal is "H" when the vehicle is driven in the 2WD mode, and it turned into "L" when the vehicle switched into the 4WD mode. Accordingly, the 2WD/4WD indicator 56 is turned off in the 2WD mode, and is turned on in the 4WD mode, so that the current driving mode is indicated as either the 2WD mode or the 4WD mode. The display mode of the 2WD/4WD indicator 56 is not limited thereto as a matter of course, and various modes are possible by changing the driving circuit.

Figure 7:
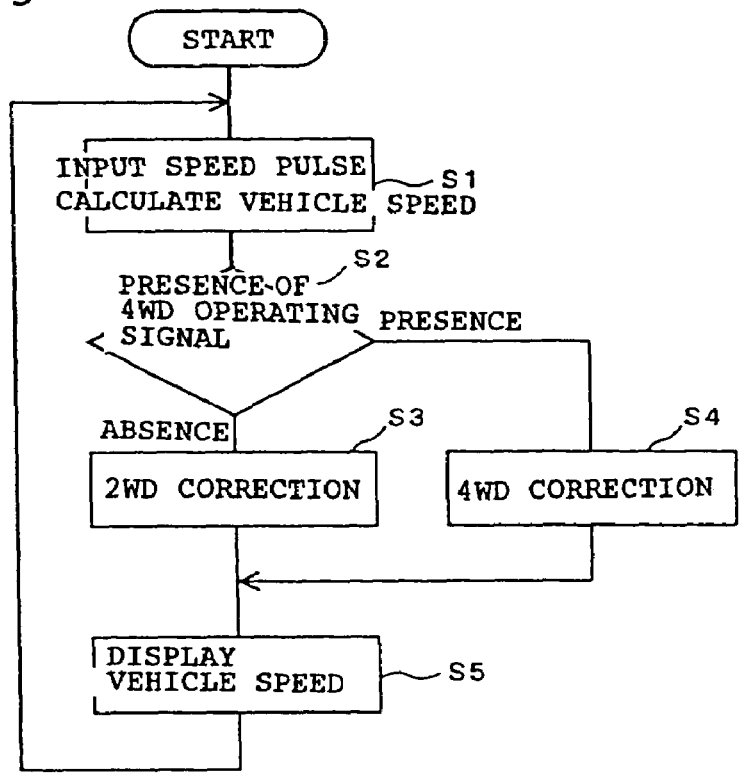
FIG. 7 is a flowchart showing the operation of the vehicle speed display apparatus shown in FIG. 5.

FIG. 7 is a flowchart showing the operation of the vehicle speed display apparatus shown in FIG. 5. In Step S1, a speed pulse supplied from the rear wheel speed sensor 22 is input to calculate the uncorrected vehicle speed. Then, in Step S2, the presence or absence of the 4WD operating signal is inspected, based on the 2WD/4WD signal. When it is determined that the 4WD operating signal is absent (in FIG. 5, when the 2WD/4WD signal is "H"), the procedure goes to Step S3, and when it is determined that it is present (in FIG. 5, 2WD/4WD signal is "L"), the procedure goes to Step S4.

In Step S3, the uncorrected vehicle speed calculated in step S1 is corrected using the 2WD correction coefficient, and in Step S4, the uncorrected vehicle speed calculated in Step S1 is corrected using the 4WD correction coefficient. In Step S5, the vehicle speed corrected in Step S3 or in Step S4 is displayed.

Though the embodiment has been described thus far, various modifications are possible in the present invention. For example, the speed sensor 22 is not limited to the one which detects only the rotational speed of the rear wheel, but may be adapted to detect that of the front wheel as well, so that the speed sensor 24 can be used in place of the speed sensor 22. In this case, it is a matter of course that the correction coefficient is differentiated from the aforementioned embodiment.

Signals to be input into the 2WD/4WD detecting unit 52 are not limited to signals for controlling display of the 2WD/4WD indicator 56, and may be those emitted directly from the control unit 21 irrespective thereto, or may be the output from the switch provided on the side of the 2WD/2WD mechanism. The 2WD/4WD indicator 56 may be a display element other than the LED, or the function of the 2WD/4WD indicator 56 may be provided to the display apparatus 23.

As is clear from the description given above, according to the invention as set forth in a first aspect, the vehicle speed corresponding to the 2WD mode can be calculated by the first calculating unit when traveling in the 2WD mode, or the vehicle speed corresponding to the 4WD mode can be calculated by the second calculating unit when traveling in the 4WD mode. Therefore, the same display accuracy of the speed with respect to the actual vehicle speed may be obtained in either the 2WD mode or the 4WD mode.

According to the invention as set forth in the second aspect hereof, since the vehicle speed may be calculated using a correction coefficient corresponding to the 2WD mode or the 4WD mode, the display speed with small error with respect to the actual vehicle speed may be obtained in the 2WD mode and the 4WD mode.

According to the invention as set forth in the third aspect hereof, when the driving mode is switched between 2WD and 4WD, calculation for 2WD and calculation for 4WD may be switched automatically for calculating the vehicle speed.

Although the present invention has been described herein with respect to a specific illustrative embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having thus, described the invention, what is claimed is:

1. A vehicle speed display apparatus for a vehicle having a plurality of wheels and a drive mode switch operable to change operation of said vehicle between a 2WD mode and a 4WD mode,
    said vehicle speed display apparatus comprising:
        a front wheel rotational speed sensor for detecting a rotational speed of at least one front wheel of said vehicle,
        a rear wheel rotational speed sensor for detecting a rotational speed of at least one rear wheel of said vehicle,
        a vehicle speed calculator for calculating vehicle speed based on a selected output from the front or rear wheel rotational speed sensor;
        a speed display mechanism for displaying the vehicle speed calculated by the vehicle speed calculator, and
        a drive mode sensor for detecting whether the vehicle is traveling in the 2WD mode or in the 4WD mode, wherein the vehicle speed calculator comprises
            a first vehicle speed calculating unit for calculating vehicle speed based on the selected output from one of said front wheel rotational speed sensor and said rear wheel rotational speed sensor, and from a first predetermined condition, and
            a second vehicle speed calculating unit for calculating vehicle speed based on the selected output from the one of the one of said front wheel wheel rotational speed sensor and said rear wheel rotational speed sensor, and from a second predetermined condition, and
        wherein the display mechanism displays the vehicle speed calculated by the first vehicle speed calculating unit or the second vehicle speed calculating unit, based on an input from the drive mode sensor, and
        wherein the first vehicle speed calculating unit and the second vehicle speed calculating unit each correct the calculated vehicle speed based on an input from the drive mode sensor.

2. A vehicle speed display apparatus for a vehicle having a plurality of wheels and a drive mode switch operable to change operation of said vehicle between a 2WD mode and a 4WD mode,
    said vehicle speed display apparatus comprising:
        a front wheel rotational speed sensor for detecting a rotational speed of at least one of the at least one front wheels of said vehicle,
        a rear wheel rotational speed sensor for detecting a rotational speed of at least one of the rear wheels of said vehicle,
        a vehicle speed calculator for calculating vehicle speed based on a selected output from the front or rear wheel rotational speed sensor;
        a speed display mechanism for displaying the vehicle speed calculated by the vehicle speed calculator, and
        a drive mode sensor for detecting whether the vehicle is traveling in the 2WD mode or in the 4WD mode, wherein the vehicle speed calculator comprises
            a first vehicle speed calculating unit for calculating vehicle speed based on the selected output from one of said front wheel rotational speed sensor and said rear wheel rotational speed sensor, and from a first predetermined condition, and
            a second vehicle speed calculating unit for calculating vehicle speed based on the selected output from the one of the one of said front wheel wheel rotational speed sensor and said rear wheel rotational speed sensor, and from a second predetermined condition, and
        wherein the display mechanism displays the vehicle speed calculated by the first vehicle speed calculating unit or the second vehicle speed calculating unit, based on an input from the drive mode sensor,
        the first vehicle speed calculating unit calculates the vehicle speed by using the selected output from the one of said front wheel rotational speed sensor and said rear wheel rotational speed sensor as a detected speed, and adjusting the detected speed using a first correction coefficient, and
        the second vehicle speed calculating unit calculates the vehicle speed using the selected output the one of said front wheel rotational speed sensor and said rear wheel rotational speed sensor as a detected speed, and adjusting the detected speed using a second correction coefficient,
        and wherein the first correction coefficient is larger than the second correction coefficient.

3. A vehicle speed display apparatus according to claim 1, wherein the drive mode sensor detects whether the vehicle is traveling in the 2WD mode or in the 4WD mode based on the position of the drive mode switch.

4. A vehicle speed display apparatus for a vehicle having a plurality of wheels and a drive mode switch operable to change operation of said vehicle between a 2WD mode and a 4WD mode,
    said vehicle speed display apparatus comprising:
        a drive mode sensor for detecting whether the vehicle is traveling in the 2WD mode or in the 4WD mode;
        a wheel rotational speed sensor for detecting a rotational speed of at least one of the wheels of said vehicle,
        a vehicle speed calculator for calculating a sensed vehicle speed based on an output from the wheel rotational speed sensor, and for correcting the sensed vehicle speed using a correction coefficient wherein the vehicle speed calculator comprises a 2WD correcting unit for correcting a detected speed when the vehicle is traveling in 2WD mode and a 4WD correcting unit for correcting a detected speed when the vehicle is traveling in 4WD mode; and
        a speed display mechanism for displaying the corrected vehicle speed calculated by the vehicle speed calculator.

5. The vehicle speed display apparatus of claim 4, wherein the correction coefficient is selected based on an input from the drive mode sensor.

6. The vehicle speed display apparatus of claim 1, wherein:
the display mechanism is operable to display the vehicle speed calculated by the vehicle speed calculator.

7. A method of displaying vehicle speed on a wheeled vehicle which is switchable between a 2WD mode and a 4WD mode, said method comprising the steps of:
 a) generating an uncorrected vehicle speed based on a signal from a vehicle speed sensor;
 b) sensing whether the vehicle is in the 2WD mode or in the 4WD mode using a drive mode sensor;
 c) adjusting the uncorrected vehicle speed using a correction coefficient to generate a corrected vehicle speed; and
 d) displaying the corrected vehicle speed on a speed display unit.

8. The method of claim 7, wherein the correction coefficient is selected corresponding to the sensed drive mode.

9. A vehicle speed display apparatus for a vehicle having a plurality of wheels and drive mode switch operable to change operation of said vehicle between a 2WD mode and a 4WD mode,
said vehicle speed display apparatus comprising:
 a wheel rotational speed sensor for detecting a rotational speed of at least one of the wheels of said vehicle,
 a vehicle speed calculator for calculating vehicle speed based on an output from the wheel rotational speed sensor;
 a speed display mechanism for displaying the vehicle speed calculated by the vehicle speed calculator, and
 a drive mode sensor for detecting whether the vehicle is traveling in the 2WD mode or in the 4WD mode,
wherein the vehicle speed calculator comprises a first vehicle speed calculating unit for calculating the vehicle speed based on the output from the wheel rotational speed sensor and a first predetermined condition, and a second vehicle speed calculating unit for calculating the vehicle speed based on the output from the wheel rotational speed sensor and a second predetermined condition,
wherein the calculation performed by the first calculating unit and the second calculating unit includes providing a correction to the calculated vehicle speed,
the calculation performed by the first calculating unit is different from the calculation performed by the second calculating unit, and
wherein the display mechanism displays the vehicle speed calculated by the first vehicle speed calculating unit or the second vehicle speed calculating unit, based on an input from the drive mode sensor.

10. A four-wheeled vehicle comprising a vehicle speed display apparatus and a drive mode switch operable to change operation of said vehicle between a 2WD mode and a 4WD mode,
said vehicle speed display apparatus comprising:
 a wheel rotational speed sensor for detecting a rotational speed of at least one of the wheels of said vehicle,
 a vehicle speed calculator for calculating vehicle speed based on an output from the wheel rotational speed sensor;
 a speed display mechanism for displaying the vehicle speed calculated by the vehicle speed calculator, and
 a drive mode sensor for detecting whether the vehicle is traveling in the 2WD mode or in the 4WD mode,
 wherein the vehicle speed calculator comprises a 2WD correcting unit for correcting a detected speed when the vehicle is traveling in 2WD mode and a 4WD correcting unit for correcting a detected speed when the vehicle is traveling in 4WD mode;
wherein the vehicle speed calculator selects a calculation for calculating vehicle speed from a first speed calculation and a second speed calculation, wherein the second speed calculation is different from the first speed calculation, and
wherein the selection of the calculation is determined based on an input from the drive mode sensor, such that when the vehicle is in the 2WD mode the result of the first calculation is displayed by the speed display mechanism, and when the vehicle is in the 4WD mode the result of the second calculation is displayed by the speed display mechanism.

* * * * *